US009120013B1

(12) United States Patent
Daniel

(10) Patent No.: US 9,120,013 B1
(45) Date of Patent: Sep. 1, 2015

(54) SYSTEM AND METHOD OF INTERACTIVE ADVERTISING USING A GAME OF CHANCE

(71) Applicant: Isaac S. Daniel, Miramar, FL (US)

(72) Inventor: Isaac S. Daniel, Miramar, FL (US)

(*) Notice: Subject to any disclaimer, the term of this patent is extended or adjusted under 35 U.S.C. 154(b) by 0 days.

(21) Appl. No.: 14/068,968

(22) Filed: Oct. 31, 2013

Related U.S. Application Data

(63) Continuation-in-part of application No. 13/632,939, filed on Oct. 1, 2012, now Pat. No. 8,814,699.

(60) Provisional application No. 61/724,403, filed on Nov. 9, 2012.

(51) Int. Cl.
*A63F 13/00* (2014.01)

(52) U.S. Cl.
CPC .................................... *A63F 13/00* (2013.01)

(58) Field of Classification Search
USPC ........................ 463/16–22, 30–31, 34, 40–43
See application file for complete search history.

(56) References Cited

U.S. PATENT DOCUMENTS

| | | | | |
|---|---|---|---|---|
| 5,941,774 | A * | 8/1999 | Takemoto et al. | 463/31 |
| 5,984,780 | A * | 11/1999 | Takemoto et al. | 463/20 |
| 6,677,967 | B2 * | 1/2004 | Sawano et al. | 715/839 |
| 6,811,492 | B1 * | 11/2004 | Arakawa et al. | 463/47 |
| 8,109,829 | B1 * | 2/2012 | Morgan et al. | 463/29 |
| 8,287,383 | B1 * | 10/2012 | Etter et al. | 463/42 |
| 2006/0111171 | A1 * | 5/2006 | Berg et al. | 463/16 |
| 2008/0209351 | A1 * | 8/2008 | Macadaan et al. | 715/762 |
| 2010/0203963 | A1 * | 8/2010 | Allen et al. | 463/30 |
| 2011/0014975 | A1 * | 1/2011 | Grabiec et al. | 463/25 |
| 2011/0069661 | A1 * | 3/2011 | Waytena et al. | 370/328 |
| 2013/0023337 | A1 * | 1/2013 | Bowers et al. | 463/25 |

* cited by examiner

*Primary Examiner* — Sunit Pandya
(74) *Attorney, Agent, or Firm* — Carol N. Green Kaul

(57) ABSTRACT

The present invention relates generally to interactive advertising and more specifically to computer games allowing advertisers to market their products, prize giveaways, coupons and the like using a game of chance in an interactive manner. To play the game, a gamer may use for example a mobile device's image capturing means for scanning at least one coded advertising image within a coded frame for which an interactive game application animates a dynamic array of game frames and randomly selects a game frame from the dynamic array for display. The randomly selected game frame may comprise of multimedia content for vouchers, prizes, giveaways, that may be redeemed for cash or other prizes.

25 Claims, 9 Drawing Sheets

SYSTEM AND METHOD OF INTERACTIVE ADVERTISING USING A GAME OF CHANCE

PRIORITY CLAIM

This patent application is a continuation-in-part patent application and claims priority to U.S. Provisional Patent Application Ser. No. 61/724,403, titled “System and Method of Using Interactive Advertising in a Roulette Game,” filed Nov. 9, 2012; and United States Non-Provisional application Ser. No. 13/632,939, titled “Social Networking Roulette Game System and Method,” filed Oct. 1, 2012. The entire disclosures of the afore-mentioned patent applications are incorporated by reference as if fully stated herein.

FIELD OF THE INVENTION

The present invention relates generally to interactive advertising and more specifically to computer games allowing advertisers to market their products, prize giveaways, coupons and the like using a game of chance in an interactive manner. To play the game, a gamer may use for example a mobile device’s image capturing means for scanning at least one coded advertising image within a coded frame for which an interactive game application animates a dynamic array of game frames and randomly selects a game frame from the dynamic array for display. The randomly selected game frame may comprise of multimedia content for vouchers, prizes, giveaways, that may be redeemed for cash or other prizes.

DESCRIPTION OF THE PRIOR ART

In today’s age where we are constantly bombarded with all types of advertisements, e.g. television commercials, radio advertisements, print advertisements in newspapers and magazines, online advertisements that reach your “Inbox” or appear as pop-ups and banners, text messages automatically sent to your mobile phone, we generally filter and most often disregard information received from multiple platforms as it creates cyber clutter. This holds true for all types of marketing, whether for restaurants, airline tickets, subscriptions, insurance and/or financial products. Thus there needs to be an efficient system and method for business owners to market and promote their products and promotions, etc., in a manner that will be well received and reviewed by the general public.

Many advertisers resort to games, e.g. MONOPOLY®, where gamers can redeem prizes or vouchers with matching game pieces. Others advertise use printed mailers, or coupon codes or other games. However, the idea of advertising using games has heretofore been limited to printed materials and has advanced minimally with developing technology. Therefore, there is a need to incorporate technological advancements in advertising strategies. This invention satisfies these long felt needs in a new and novel manner and solves the foregoing problems that the prior art has been unable to resolve. For a further and more fully detailed understanding of the present invention, various objects and advantages thereof, reference is made to the following detailed description and the accompanying drawings.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

DETAILED DESCRIPTION OF PREFERRED EMBODIMENTS

Systems

Figure 1:
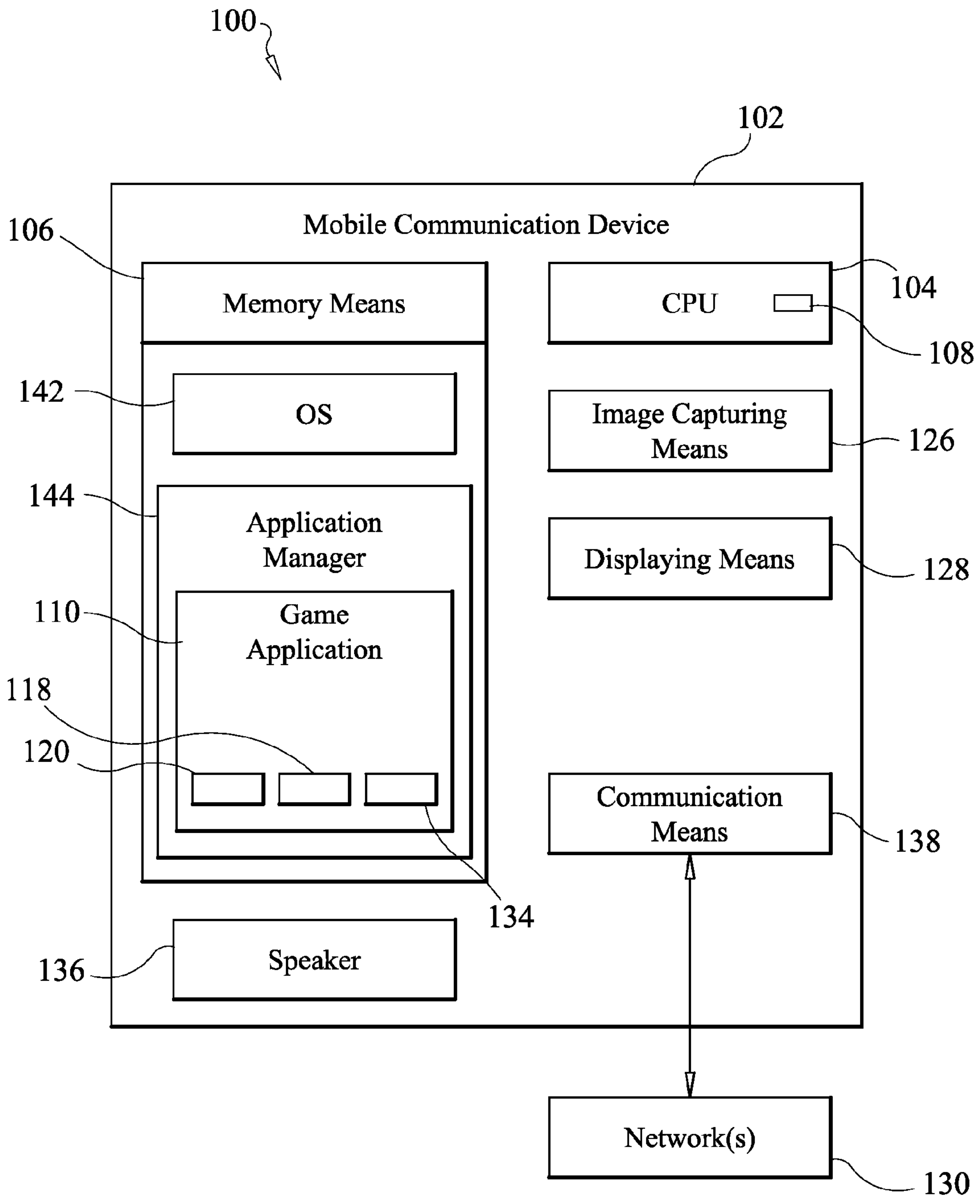
FIG. 1 shows an exemplary system in accordance with one embodiment.

FIG. 1 shows an exemplary system 100 in accordance with one embodiment of the invention. System 100 comprises of: a mobile device 102 that includes a computer processor 104 in electronic communication with memory means 106; computer executable instructions 108 readable and executable by the computer processor 104 and configured for performing any one or more of the following: launching an interactive game application program (“interactive game app”) 110 configured for controlling at least one or more game frames 112, 112' corresponding to at least one coded advertising image 114 within a coded frame 116; wherein the interactive game app 110 comprises of computer executable instructions 108' readable and executable by the computer processor 104 and configured for performing any one or more of the following: animating a dynamic array 122 of game frames 112, 112'; and randomly selecting a game frame 112 from the dynamic array 122 for display; the mobile device’s image capturing means 126 for scanning the at least one coded advertising image 114 within a coded frame 116; and displaying means 128 for displaying the dynamic array 122 of game frames 112, 112' as well as the selected game frame 112 and its respective at least one multimedia content 124 within the coded frame 114, and the like. Dynamic array 122 may include any one or more of the following: a virtual wheel barrel, a scrolling arrangement, a rotating circumferential arrangement, a dynamic matrix, or a pop-up arrangement. Multimedia content 124 as used herein includes any one or more of the following: videos, promotions, prizes, giveaways, vouchers, coupons, coupon codes, bar codes, discounts, pricing, availability, store locations, directions, television commercials, radio advertisements, print advertisements, movies, movie trailers and the like.

Mobile device 102 may be any type of electronic, computerized, network enabled communication device configured with means for communicating wirelessly and/or wired with other mobile devices 102', 102", such as but not limited to, cellular phones (e.g., an iPhone, Android, Palm, Blackberry, or any "smart phone" as are generally known and used in the arts), location-aware portable phones (such as GPS), a personal computer, server computer, or laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network 130, wide area network such as the Internet 130, or any other type of network enabled device that may communicate over a network 130. Computer 132 as used herein includes but is not limited to a network enabled computer, cellular phones, a laptop or personal digital assistant subject to wired/wireless connectivity, and configured with a computer processor 104.

Mobile device 102 may include various hardware components, e.g. at least one or more computer central processor 104, memory means 106, and one or more communication means 138. Computer central processor 104 may be any type of processor, and may reside in a client computer, such as a PC, laptop, smart phone, tablet PC, iPad, notebooks, net books, and the like, a server computer, or on a cloud computer. Computer central processor 104 may include but is not limited to, a central processing unit (CPU), a microprocessor, a video processor, a front end processor, a coprocessor, a single-core central processor, a multi-core processor, and the like. Central processor 104 may be programmed to activate the interactive game app 110 running in background while the mobile device 102 is powered on, for controlling multimedia content 124 corresponding to at least one coded advertising image 114 within a coded frame 116 as displayed on the mobile device's displaying means 128 in for example a graphical, audio, and/or text format.

In some embodiments, the interactive game app 110 may have its own icon 120 or other visual indicator displayed thereon for launching or providing access to the interactive game app 110. When a user selects the respective interactive game app's icon 120 (e.g. by touching a touchscreen, or selecting it using a radio button, pointing device, mouse, roller ball, arrow keys, a gesture recognition device or other controller), upon selection, the computer central processor 104, launches the interactive game app 110 and the computer central processor 104, which is electronically connected to the displaying means 128, controls the displaying means 128 to display the interactive game app 110 as launched on the at least one mobile device's displaying means 128.

Mobile device 102 may include at least one or more memory means 106 either electrically or mechanically connected to the at least one computer processor 104. In the case of electronic connections, the electronic connections may be wired and/or wireless connections. Memory means 106 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. Memory means 106 may be used to store information, such as coded advertising images 114, 114', hyperlinks 118, 118' corresponding to the coded advertising images 114, 114', registered multimedia content 124, 112' for the corresponding coded advertising images 114, 114', company's website address or Uniform Resource Locators (URLs), control commands 134, 134', coded frames 116, 116', and the like. Information stored on the mobile device's memory means 106 may be retrieved using the computer processor 104 and may be published by push notification on the mobile device's displaying means 128 or broadcasted over a speaker 136 using the type and configuration of speakers that are well known and used in the arts for mobile devices 102, 102'.

Mobile device 102 is equipped with communication means 138, either electrically or mechanically connected to the computer central processor 104. In the case of electronic connections, the electronic connections may be wired and/or wireless. In some embodiments, communication means 138 may be a wireless communication means 138, which employ short range wireless protocol, such as, but not limited to, a radio frequency transceiver, a radio frequency receiver, and/or a radio frequency transmitter for communicating over the Internet to access for example registered companies URLs and their corresponding multimedia advertisements 112, 112' that correspond to the coded advertising images 114, 114' displayed on for example, graphic media 140, 140'. Graphic media 140 as used herein includes but is not limited to: a business card, a menu, a program, a printed article, magazine page, newspaper insert, an advertising card, publications (magazines, newspapers and books), print advertisements, posters, billboards, product packaging, and the like. It is understood that the graphic media 140 could be displayed on any object that lends itself to having media advertising on the object or attached thereto, e.g. a wallet, cup, lottery ticket and the like. Each coded advertising image 114 is unique even if the multimedia advertisements 112, 112' are not.

In embodiments where the wireless communication means 138 is a radio frequency receiver, the radio frequency receiver may be any type of radio frequency receiver, including, but not limited to, a positioning system receiver, such as a global positioning system receiver and a local positioning system receiver, such as a Wi-Fi positioning system receiver. In other embodiments, the communication means 138 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication means 138 are operative to transmit or receive electronic communications, i.e. electronic data, audio, videos, text, pictures, graphs and the like via a short range wireless protocol, such as, but not limited to, a radio frequency receiver, a radio frequency transmitter, or a radio frequency transceiver and to communicate over the Internet 136.

Mobile device 102 includes a computer processor 104, disposed within and in electronic communication with the memory means 106. Computer processor 104 includes computer executable instructions 108 readable and executable by the at least one processor 104. Computer executable instructions 108 are operative to perform all the necessary functions for the system 100 and methods disclosed herein, including but not limited to: launching the interactive game app 110, i.e. running a background service while the mobile device 102 is powered on, that is configured for controlling at least one or more game frames 112, 112' corresponding to at least one coded advertising image 114 within a coded frame 116 and the like. Computer executable instructions 108 may be loaded directly on the mobile device's processor 104, or may be stored in mobile device's memory means 106, that includes but is not limited to, computer readable media, such as, but not limited to, a hard drive, a solid state drive, a flash memory, random access memory, CD-ROM, CD-R, CD-RW, DVD-ROM, DVD-R, DVD-RW, and the like. Computer executable instructions 108 may be any type of computer executable instructions 108, which may be in the form of a computer program, the program being composed in any suitable programming language or source code, such as C++, C, JAVA, JavaScript, HTML, XML, and other programming languages.

Interactive game app 110, which may be stored in the mobile device's memory means 106, also comprises of computer executable instructions 108' readable and executable by the at least one processor 104 and is configured for performing any and all the necessary application functions described herein, which may include any one or more of the following: controlling game frames 112, 112' corresponding to at least one coded advertising image 114 within a coded frame 116 that includes at least one or more hyperlinks 118, 118' or icons 120, 120' embedded within; issuing a command 134 to the computer processor 104 to activate the image capturing means 126 for scanning at least one coded advertising image 114 within the coded frame 116; displaying the dynamic array 122 of game frames 112, 112'; receiving one or more commands +134, 134' to animate the dynamic array 122 of game frames 112, 112'; animating the dynamic array 122 of game frames 112, 112' for randomly selecting a game frame 124; randomly selecting a game frame 112 from the dynamic array 122 for display; and displaying the selected at least one game frame 112 and its respective at least one multimedia content 124 within the coded frame 116, and the like.

Mobile device 102 may include any kind of displaying means 128, such as, but not limited to: a liquid crystal display ("LCD") screen, a light emitting diode ("LED") display, touchpad or touch screen display, and/or any other means known in the arts for emitting a visually perceptible output. Mobile device's processor 104 is in electronic communication with its displaying means 128. In other embodiments, displaying means 128 is wirelessly connected to processor 104. Displaying means 128 may include control means, such as, but not limited to, a touch screen, a stylus, and the like. In some embodiments, displaying means 128 may be electronically connected to a mobile device 102 according to the hardware and software protocols that are known and used in the arts. Computer central processor 104 controls the mobile device's displaying means 128, which is configured for displaying the dynamic array 122 of game frames 112, 112', selected game frame 112, multimedia contents 112, 112' and the like.

Mobile device 102 also includes software components that may be stored in the memory means 106. Memory means 106 may include computer storage media, for example volatile memory, non-volatile memory, data storage devices, or the like. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by mobile device 102. Mobile device 102 may also contain an input element for inputting data and an output element for displaying data.

Also stored on the memory means 106 may be an operating system 142, application manager 144, and the interactive game app 110. Interactive game app 110 may be an independent component or may be incorporated into the operating system 142. Interactive game app 110 is a computer-executable component, readable and executable by the computer processor 104, wherein the interactive game app 110 links to the Internet 130 to retrieve at least one or more multimedia contents 112, 112' to be displayed on the mobile device's displaying means 128 or the graphic media 140. The multimedia contents 112, 112' may be in any format, e.g. audio, video, pictorial, text message, graph, and as such is published or also broadcasted in any format on the mobile device 102.

Application manager 144 comprises of computer-executable components that operate in the mobile device 102 and may be implemented in a variety of ways. In one embodiment of the invention, application manager 144 may use one or more computer-executable components for interacting with interactive game app 110. In another embodiment, interactive game app 110 is incorporated in application manager 144 to receive information from the input element, to communicate with, and/or to control the operations of interactive game app 110.

Interactive game app 110 may comprise in part of a browser, such as for use on the mobile device 102, or a similar browsing device. Interactive game app 110 may be any type of software application, such as a standalone application designed to run on a mobile platform, such as a mobile device 102 running an operating system 142 such as iOS™, Android™, Windows Mobile™, Blackberry™, and the like as are commonly known and used in the arts, wherein the operating system 142 is capable of connecting to the Internet 130 either through a version of Linux OS, Windows Media OS, or a Java based applet and the like. Interactive game app 110 may be operative for an iPhone, any other "smart phone," mobile device, cellular phone, PDA, GPS or any other mobile device 102 capable of handling electronic transactions dealing with dynamic content, object, application, or software. In some embodiments, the interactive game app 110 may be designed to run on a social network platform, such as FACEBOOK® or JUSTSYNC®. In some embodiments, interactive game app 110 may reside on a server computer 132 and may be downloadable therefrom or otherwise reside in the mobile device's local memory means 106. For example, in one embodiment, the interactive game app 110 may be on a mobile device (such as an iPhone, Blackberry, or other "smart phone") and the full-sized software program may be on a computer, where communications may occur over a network 138 or directly, either wired or wirelessly.

FIGS. 2A-2D show an exemplary embodiment of the game 202 of invention whereby the graphic media 140 includes a printed advertisement on a drinking cup. In the exemplary embodiment, the game 202 is an electronic game with a virtual wheel barrel 122 arranged in a rotating circumferential arrangement. It is understood that the dynamic array 122 of game frames 112, 112' could have been displayed as a scrolling arrangement, a dynamic matrix, a pop-up arrangement or any other gaming arrangement that are well known and used in the arts and to be invented.

A gamer may start playing the game 202 by launching the interactive game app 110, which controls game frames 112, 112' corresponding to at least one coded advertising image 114 within a coded frame 116 that includes at least one or more hyperlinks 118, 118' or icons 120, 120' embedded within. Once the interactive game app 110 is launched by hovering a network enabled computer device's 132 image capturing means 126, e.g. a cellular phone 102, at, near, or over the scanable, at least one coded frame image 114, the interactive game app 110 that is in electronic communication with the processor 104 issues a command 134 to the computer processor 104 to activate the image capturing means 126 to scan the at least one coded advertising image 114 within the coded frame 116 with the at least one embedded hyperlink 118 or icon 120 embedded therein. Image capturing means 122 captures an image 204 of the coded frame image 114 and the interactive game app 110 issues a command 134 to the computer processor 104 to activate the displaying means 128 to display the dynamic array 122 of game frames 112, 112' for the game 202, which the displaying means 128 displays. In some embodiments, as soon as the dynamic array 122 of game frames 112, 112' is displayed the interactive game app 110 automatically animates the dynamic array 122. In this manner, the gamer has minimal input as to when or how long to animate the dynamic array 122, or control over the game's 202 resulting outcomes, i.e. randomly selected game frame 124.

In other embodiments the interactive game app 110 first receives at least one or more input commands 134, 134' as to when to activate the dynamic array 122 of a plurality of game frames 112, 112', and for how long to animate the dynamic array 122. For example, in an exemplary embodiment, the display of the dynamic array 122 may be prefaced with game playing instructions for selecting a virtual radio button 206, e.g. a radio button 206 marked "PLAY" or "SPIN", or denoted graphically as an arrow (">") so that the random selection of a game frame 112 may begin. The command 134 to activate the dynamic array 122 may be inputted using a touchscreen, or using a radio button, pointing device, mouse, roller ball, arrow keys, a gesture recognition device or any other controller that is well known and used in the arts for command 134 inputs. In some embodiments, the length of time for animation is derived from how long e.g. a finger gesture, is detected as remaining on, for example, the radio button 206 to commence the animation.

In some embodiments, an advertisement comprising of multimedia content 124 may be displayed prior to the game being started, i.e. prior to the interactive game app 110 receiving a command 134 to animate the dynamic array 122 of game frames 112, 112' or automatically animating the dynamic array 122 of game frames 112, 112'. Here, advertisers may use that window to broadcast their advertisement, e.g. multimedia content 124 that may be in audio, video, pictorial, text message, graph, or any other format as deemed appropriate on the mobile device 102.

In either embodiments, the interactive game app's 110 computer executable instruction code 108' animates the dynamic array 122 of a plurality of game frames 112, 112' by animating the virtual wheel barrel 122 to virtually rotate and display the spinning virtual wheel barrel 122 until the interactive game app 110 randomly selects a game frame 112 from the dynamic array 122, which gets displayed. The number of game frames 112, 112' is unlimited and only limited by the game creator's choices. Upon selection of the randomly selected game frame 112, the interactive game app 110 communicates the request for display to the processor 104, which activates the displaying means 128 to display the selected at least one game frame 112 and its respective at least one multimedia content 124. In some embodiments, the at least one multimedia content 124 may comprise of, for example, pertinent advertising information, coupons, voucher, or videos, redeeming game pieces and the like that may be displayed in text, video, or any other multimedia format. In some embodiments, the multimedia content 124 may not be stored with the interactive game app 110 and access to the multimedia content 124 requires using the embedded hyperlinks 118, 118' and/or icons 120, 120' to access stored content from the advertiser by hyperlinking to the advertiser's websites or advertiser provided Uniform Resource Locator (URLs) over the computer network 130.

Figure 2A:
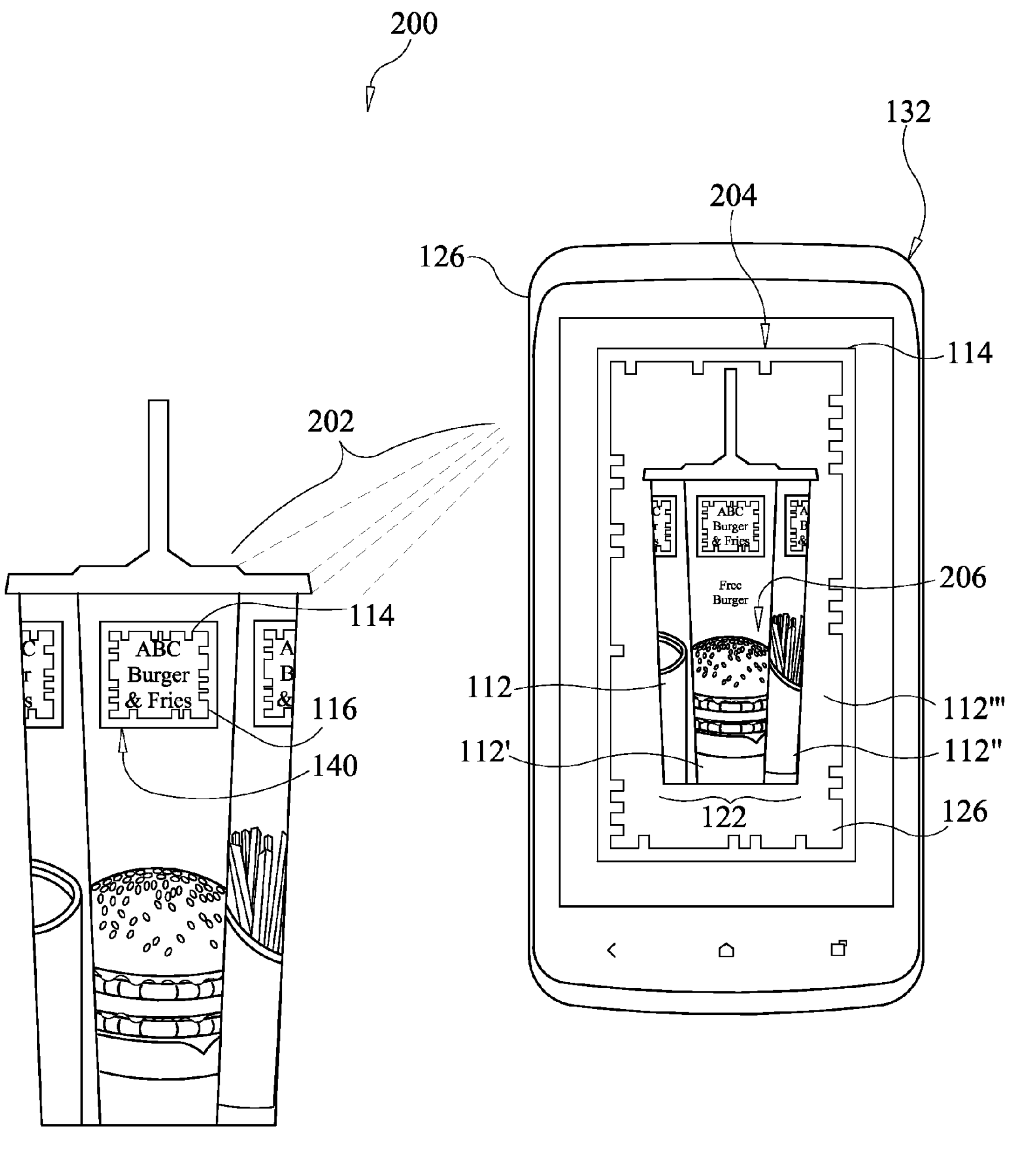
FIGS. 2A-2D show an exemplary embodiment of the game of the invention.
Figure 2B:
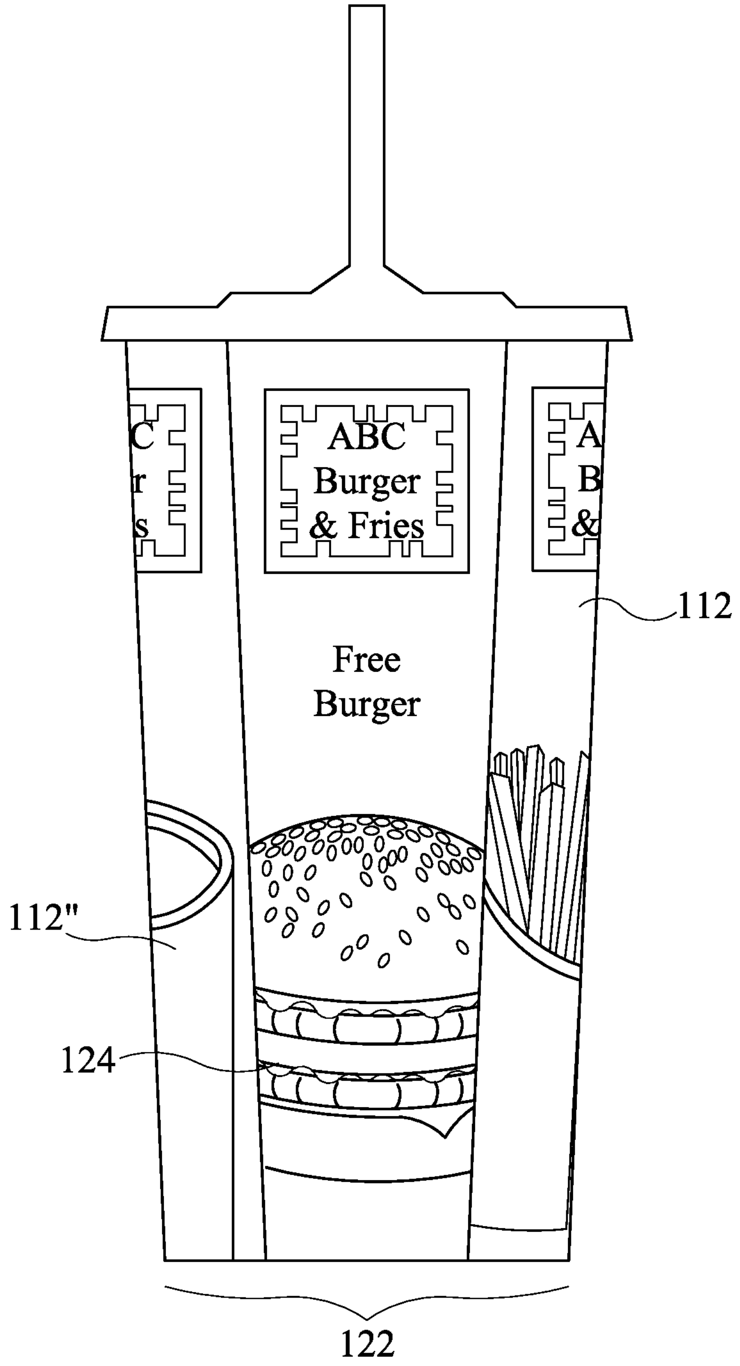
Figure 2C:
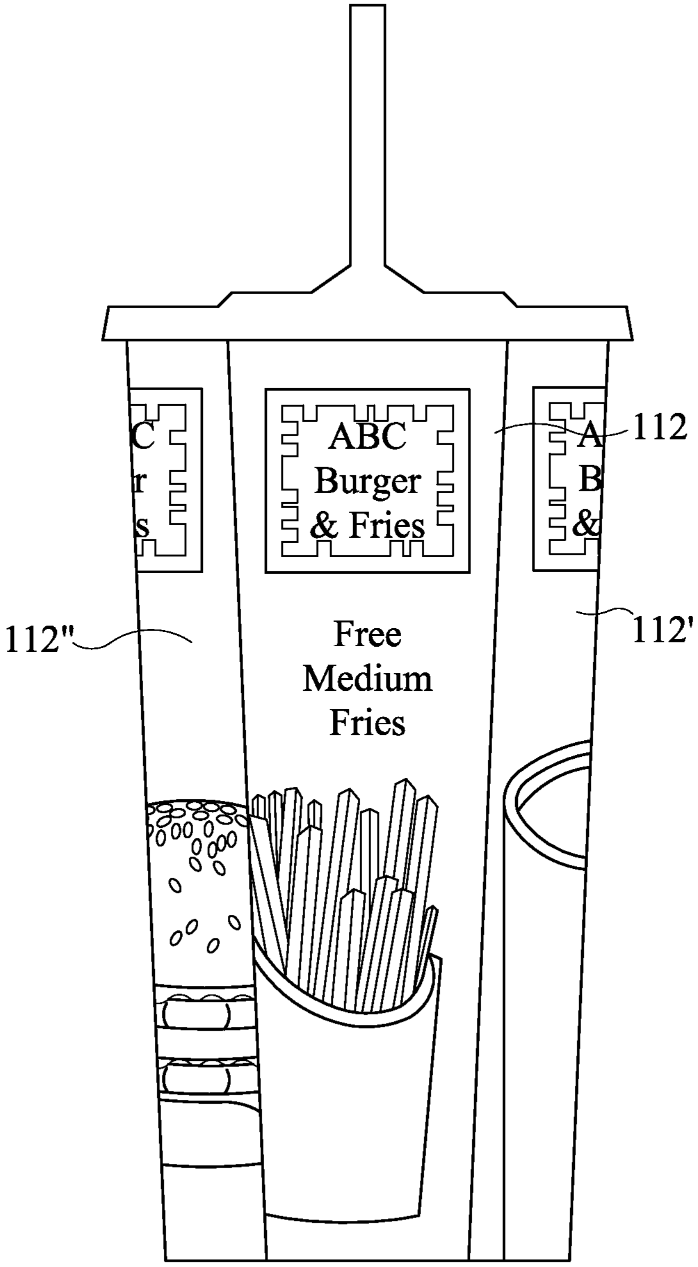
Figure 2D:
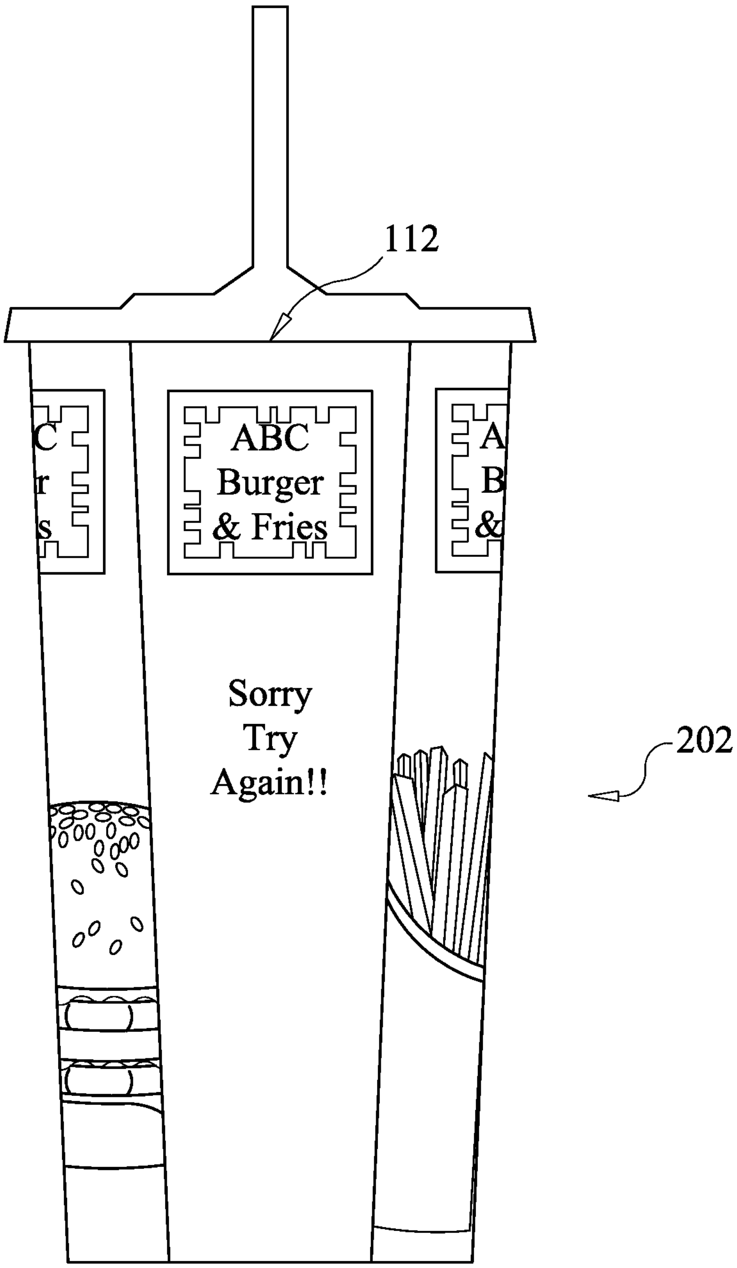

As shown in FIGS. 2B-2D, the exemplary randomly selected game frame 112 include multimedia content 124 providing for the gamer to redeem prizes, e.g. free burger, free medium fries, or free nuggets. Since this is a game 202 of chance, gamer has no assurance that the desired game frame 112, e.g. free burger, will be the randomly selected as the interactive game app 110 could easily have randomly selected a game frame 112 with no winnings, e.g. "SORRY TRY AGAIN" as shown in FIG. 2D.

Figure 3:
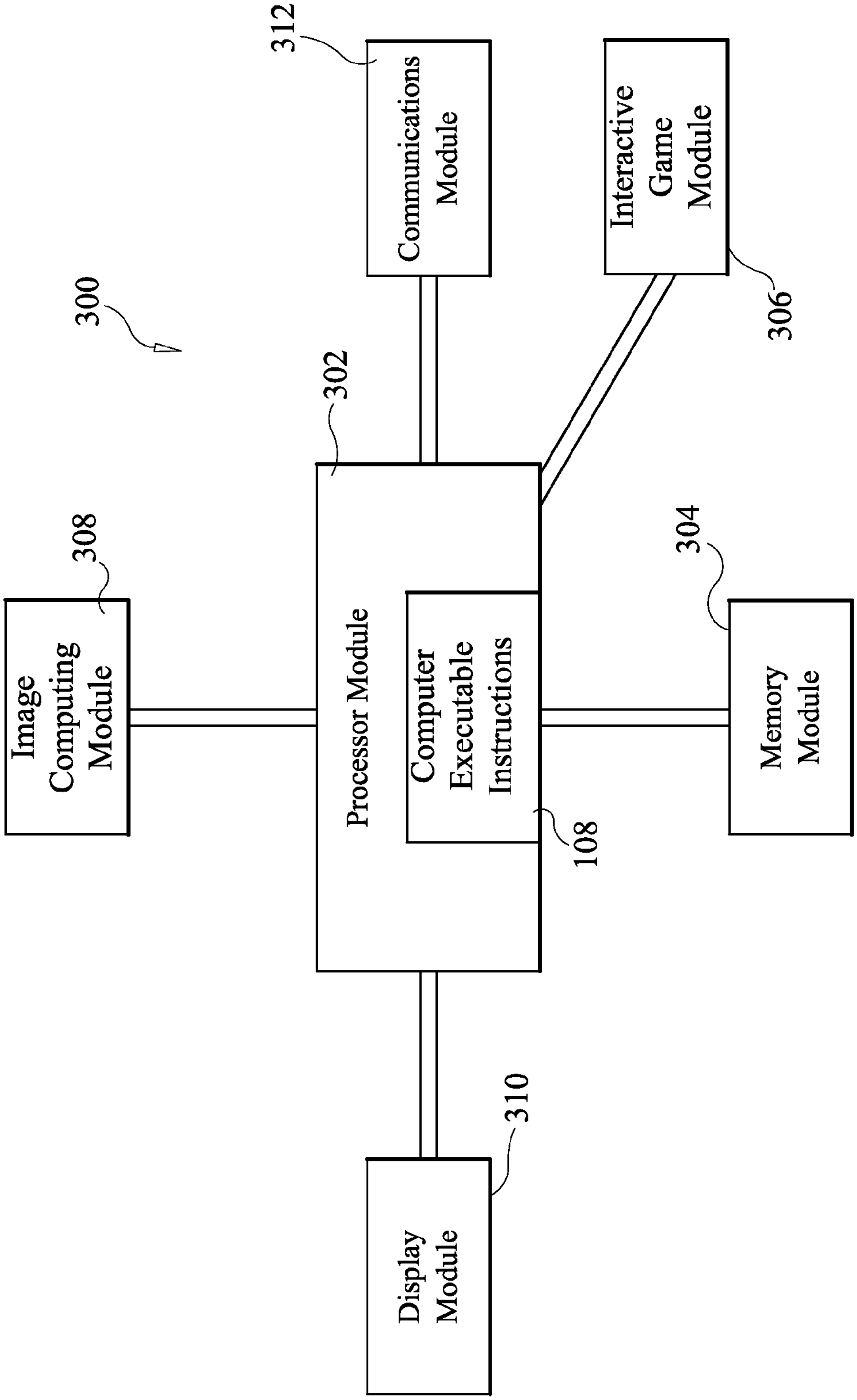
FIG. 3 shows a block diagram representing a system in accordance with one embodiment.

FIG. 3 shows a block diagram representing a system 300 in accordance with one embodiment. System 300 comprises of a processor module 302 in communication with a memory module 304. The term "module" as used throughout this disclosure refers to a unit of distinct functionality that may be presented in software, hardware, or combinations thereof. When the functionality of a module is performed in any part through software, the module includes a machine readable medium.

In one embodiment, processor module 302 may comprise a hardware aspect such as a computer processor 104, including, but not limited to, any of those previously described with reference to the embodiments described throughout the present disclosure. In another embodiment, processor module 302 may comprise a software aspect, such as, but not limited to, a computer program comprising computer executable instructions 108, such as an operating system, communications software, and the like. In yet another embodiment, processor module 302 may comprise both hardware and software aspects, such as those described directly above and elsewhere throughout the present disclosure.

Computer executable instructions 108 may be any type of computer executable instructions, which may be in the form of a computer program, the program being composed in any suitable programming language or source code, such as C++, C, JAVA, JavaScript, HTML, XML, and other programming languages. Computer executable instructions 108 are readable and executable by the at least one processor module 302 and may be embedded within the processor module 302 or may be stored on the mobile device's memory module 304. Processor module's computer executable instructions 108 are configured for performing any one or more of the following system functions: launching an interactive game application module 306 configured for controlling at least one or more game frames 112, 112' corresponding to at least one coded advertising image 114 within a coded frame 116. The at least one coded advertising image 114 within a coded frame 116 includes embedded codes that are not visible to the naked eye but can be functionally operational when engaged.

The interactive game application module 306 comprises of software aspects, i.e. a computer program also comprising of computer executable instructions 108' readable and executable by the at least one processor module 302 and is configured for performing any and all the necessary application functions described herein, which may include any one or more of the following: controlling game frames 112, 112' corresponding to at least one coded advertising image 114 within a coded frame 116 that includes at least one or more hyperlinks 118, 118' or icons 120, 120' embedded within; issuing a command 134 to the computer processor module 302 to activate the image capturing module 308 for scanning at least one coded advertising image 114 within the coded frame 116; displaying the dynamic array 122 of game frames 112, 112'; receiving one or more commands 134, 134' to animate the dynamic array 122 of game frames 112, 112'; animating the dynamic array 122 of game frames 112, 112' for randomly selecting a game frame 124; randomly selecting a game frame 112 from the dynamic array 122 for display; and displaying the selected at least one game frame 112 and its respective at least one multimedia content 124 within the coded frame 116, and the like.

Image capturing module 308 may comprise of a hardware aspect such as a camera, including but not limited to, any of those previously described with reference to the embodiments described throughout the present disclosure. In another embodiment, Image capturing module 308 may comprise of a software aspect, such as, but not limited to, a computer program in communication with the processor module 302 such that the processor module 302 can control the image capturing module 308. Image capturing module 308 is configured for scanning at least one or more game frames 112, 112' corresponding to at least one or more coded advertising images 114, 114' within a coded frame 116.

Memory module 304 is used to store information thereon. In various embodiments of the system 300, such information may include, but is not limited to, coded advertising images 114, 114', hyperlinks 118, 118' corresponding to the coded advertising images 114, 114', registered multimedia content 124, 112' for the corresponding coded advertising images 114, 114', company's website address or Uniform Resource Locators (URLs), control commands 134, 134', coded frames 116, 116', and the like. Information stored on the memory module 304 may be retrieved using the processor module 302 and may be published by push notification using the displaying module 210 or broadcasted over a speaker 136 using the type and configuration of speakers that are well known and used in the arts for mobile devices 102, 102'. The information stored thereon may be retrieved from memory module 304 using the processor module 302 and may be published by push notification using the mobile device's displaying module 310 or broadcasted over a speaker 136 using the type and configuration of speakers that are well known and used in the arts for mobile devices 102, 102'. In one embodiment, memory module 304 may be connected to the processor module 302 via a circuit board. In some embodiments, the aforementioned connections may be electronic connections and/or mechanical connections. In the case of electronic connections, the electronic connections may be wired and/or wireless.

In one embodiment, memory module 304 may possess a hardware aspect, such as storage hardware. Such storage hardware may include, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash disks, and the like, and random access memory. In another embodiment, memory module 304 may possess a software aspect, such as, but not limited to, database building software, file management software, and the like. In yet another embodiment, memory module 304 may comprise both hardware and software aspects, such as those described directly above and elsewhere throughout the present disclosure.

Figure 4:
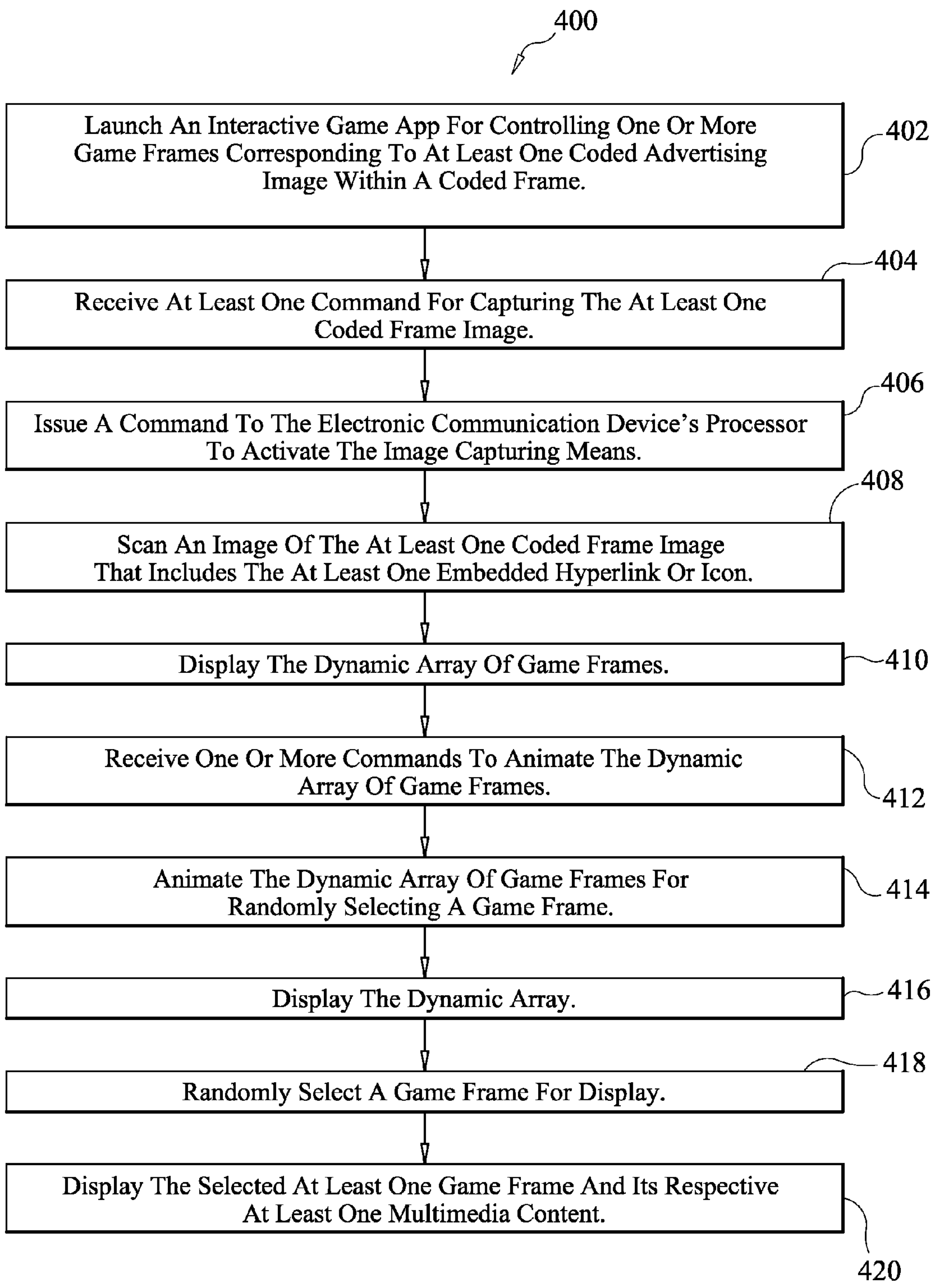
FIG. 4 shows an exemplary method in accordance with one embodiment.
Figure 5:
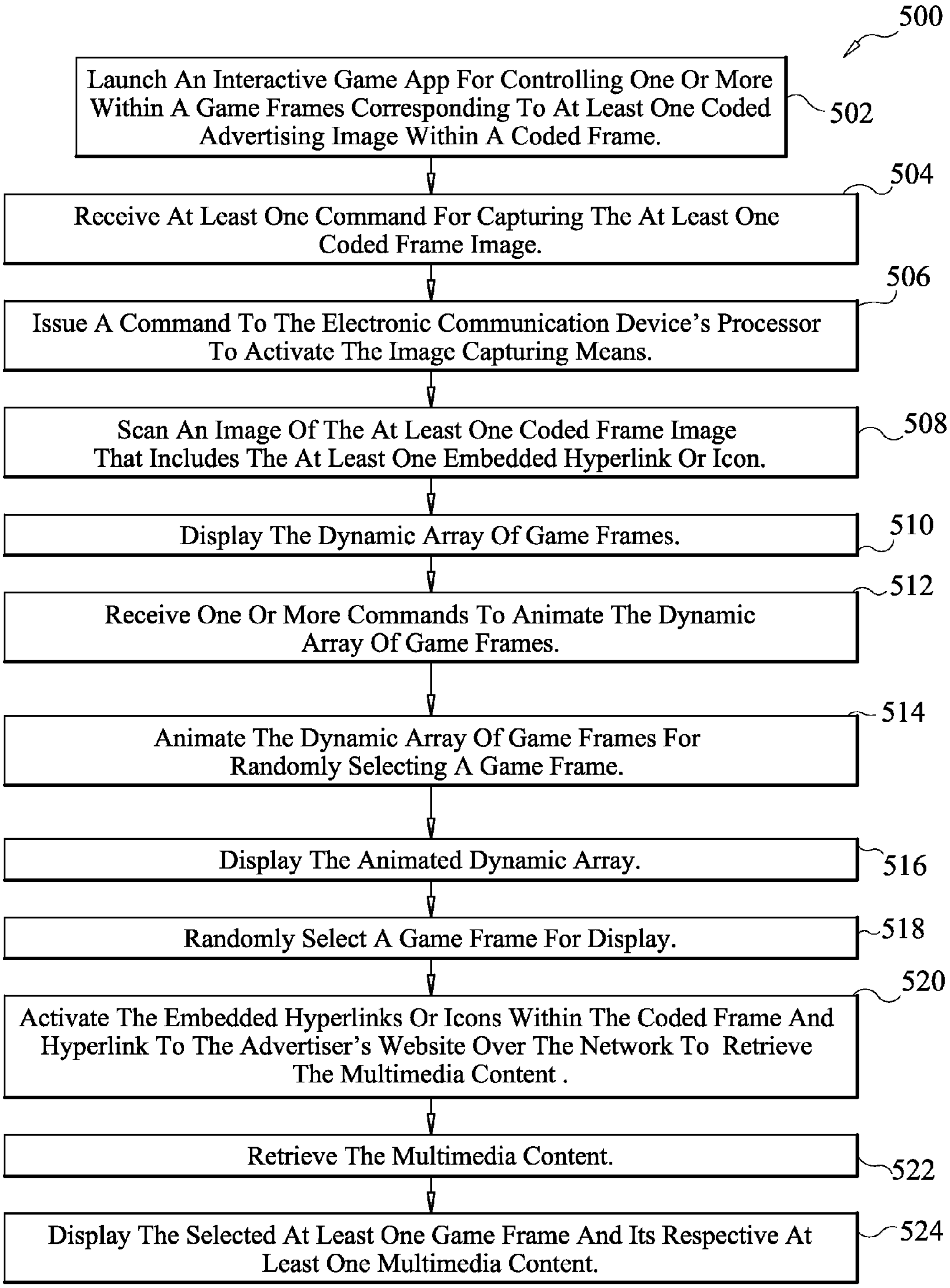
FIG. 5 shows an exemplary method in accordance with one embodiment.

Embedded within the processor module 302 are computer executable instructions 108 readable and executable by the at least one processor module 302, where the computer executable instructions 108 are operative to perform the varied system functions of the systems 100-200 and methods 400-500 (as shown in FIGS. 4 & 5) disclosed herein. Computer executable instructions 108 may be any type of computer executable instructions 108, which may be in the form of a computer program, the program being composed in any suitable programming language or source code, such as C++, C, JAVA, JavaScript, HTML, XML, and other programming languages. The computer executable instructions 108 may be stored on a non-transitory medium, such as a hard drive, a solid state drive, a disc, and the like. The computer executable instructions 108 may be in a transitory medium, such as a signal, electrical wave, or radio-frequency wave.

Display module 310 may comprise of software and hardware aspects. Display module 310 is in electronic communication with the processor module 302, which controls the software and hardware aspects of the display module 310. Such hardware aspects may include any kind of means for electronic displays, such as, but not limited to, an LCD or LED type, plasma, touch screen or other types of displays that are well known and used in the arts. Display module 310 may be used to display information concerning game frames 112, 112', dynamic array 122 of game frames 112, 112', the selected game frame 112, multimedia content 112 and the like.

System 300 further comprises a communications module 312 may include means for communicating wirelessly and include but is not limited to, a radio frequency transceiver, a radio frequency receiver, a local positioning system receiver, such as a Wi-Fi positioning system receiver, or a wireless modem, such as, but not limited to, a global system for mobile communications (GSM) modem and/or a radio frequency transmitter, including, but not limited to, a Bluetooth module or a Global Positioning System (GPS) transponder with transmitting and receiving means for communicating with either via a geosynchronous (GEO) or Low Earth Orbit (LEO) satellite in a network 130. Communications module 312 is connected to the at least one processor module 302 is triggered for transmitting the request for multimedia content 124 when the interactive game application module 306 determines that the multimedia content 124 to be shown for the selected game frame 112 is not stored with the interactive game module 206 and therefore a hyperlinking to the advertiser's website is necessary.

Methods

FIG. 4 is an exemplary method 400 of the invention according to one embodiment. Method 400 comprises of launching from a network enabled communication device 102, an interactive game app 110 for controlling one or more game frames 112, 112' corresponding to at least one coded advertising image 114 within a coded frame 116 (step 402) that includes at least one or more hyperlinks 118, 118' or icons 120, 120' embedded within. The interactive game app 110 may comprise in part of a browser, such as for use on the electronic communication device 102 with displaying means 128. Interactive game app 110 may be any type of software application, such as a standalone application designed to run on a wireless platform, implementing an operating system 142 capable of connecting to the Internet 130 either through a version of Linux OS, Windows Media OS, or a Java based applet and the like. Interactive game app 110 is capable of handling electronic transactions dealing with dynamic content, object, application, or software. In some embodiments, interactive game app 110 may reside on a server computer 132 and may be downloadable from the server computer 132 or otherwise reside on the electronic communication device's local memory means 106. In one embodiment, the interactive game app 110 may be on an electronic communication device 102 and the full-sized software program may be on a server computer 132, where communications may occur over a network 132 or directly, either wired or wirelessly. As such the user may use his/her smart network enabled communication device 102 to interact with the coded frame image 114.

Method 400 further comprises of receiving at least one command 134 for capturing the at least one coded frame image 114 (step 404), for which the interactive game app 110 is configured for issuing a command 134 to the electronic communication device's processor 104 that is in electronic communication with the image capturing means 122 to activate the image capturing means 126 (step 406) for scanning at least one coded advertising image 114 within the coded frame 116. The image capturing means 122 scans an image 202 of the at least one coded frame image 114 that includes the at least one embedded hyperlink 116 or icon 120 (step 408). The captured image 202 is then available for display. Accordingly the interactive game app 110 issues a command 134 to the processor 104 that is in electronic communication with the displaying means 128 for displaying the dynamic array 122 of game frames 112, 112' (step 410).

In some embodiments, method 400 comprises of receiving one or more commands 134, 134' to animate the dynamic array 122 of game frames 112, 112' (step 412). Dynamic array 122 may include any one or more of the following: a virtual wheel barrel, a scrolling arrangement, a rotating circumferential arrangement, a dynamic matrix, or a pop-up arrangement. The input command 134 may be inputted using a touchscreen, or using a radio button, pointing device, mouse, roller ball, arrow keys, a gesture recognition device or any other controller that is well known and used in the arts for command inputs. In some embodiments, the length of time for animation is derived from how long e.g. a finger gesture is detected as remaining on for example the radio button 206 to commence the animation. The control command 134 may be inputted by selecting a virtual radio button 206, e.g. a radio button 206 marked "PLAY" or "SPIN", so that the selection of a game frame 112 may begin. In some embodiments, the length of time for animation is derived from how long e.g. a finger gesture is detected as remaining on for example the radio button 206 to commence the animation. In some embodiments, the interactive game app 110 displays multimedia content 112 prior to receiving a command 112 to animate the dynamic array 122 of game frames 112, 112' so that advertisements, promotions or public service announcements may be broadcasted before the animation of the display array 122.

Method 400 further comprises the interactive game app's 110 computer executable instruction code 108' animating the dynamic array 122 of game frames 112, 112' for randomly selecting a game frame 112 (step 414). In an exemplary embodiment, animation entails causing the virtual wheel barrel 122 to virtually rotate and display the animated dynamic array, e.g. the spinning virtual wheel barrel 122 (step 416) until the interactive game app 110 randomly selects a game frame 112 for display (step 418) from the dynamic array 122 comprising of a plurality of game frames 112, 112', which can be as numerous as the game creator elects.

Method 400 further comprises, the interactive game app 110 communicates the request for display to the processor 104, which activates the displaying means 128, which upon activation displays the selected at least one game frame 112 and its respective at least one multimedia content 124 (step 420) within the coded frame 116 and/or the like. As previously discussed, multimedia content 124 as used herein includes any one or more of the following: videos, promotions, prizes, giveaways, vouchers, coupons, coupon codes, bar codes, discounts, pricing, availability, store locations, directions, television commercials, radio advertisements, print advertisements, movies, movie trailers and the like.

In some embodiments, the at least one multimedia content 124 may comprise of, for example, pertinent advertising information, coupons, voucher, or videos, redeeming game pieces and the like that may be displayed in text, video, or any other multimedia format. In some embodiments, the embedded hyperlinks 118, 118' or icons 120, 120' are used to access stored content from the advertiser by hyperlinking to the advertiser's websites or advertiser provided Uniform Resource Locator (URLs) over a cellular network 130 as the multimedia content 124 may not be stored with the interactive game app 110.

FIG. 5 is an exemplary method 500 of the invention according to one embodiment. Method 500 comprises of launching from a network enabled communication device 102, an interactive game app 110 for controlling one or a plurality of game frames 112, 112' corresponding to at least one coded advertising image 114 within a coded frame 116 that includes at least one or more hyperlinks 118, 118' or icons 120, 120' embedded within (step 502). Method 500 further comprises of receiving at least one command 134 for capturing the at least one coded frame image 114 (step 504), for which the interactive game app 110 is configured for issuing a command 134 to the electronic communication device's processor 104 that is in electronic communication with the image capturing means 122 to activate the image capturing means 126 (step 506) for scanning at least one coded advertising image 114 within the coded frame 116. The image capturing means 122 scans an image 202 of the at least one coded frame image 114 that includes the at least one embedded hyperlink 116 or icon 120 (step 508). The captured image 202 is then available for display. Accordingly the interactive game app 110 issues a command 134 to the processor 104 that is in electronic communication with the displaying means 128 for displaying the dynamic array 122 of game frames 112, 112' (step 510).

Method 500 further comprises of receiving one or more commands 134, 134' to animate the dynamic array 122 of game frames 112, 112' (step 512). The interactive game app's 110 computer executable instruction code 108' animates the dynamic array 122 of game frames 112 112' (step 514), for randomly selecting a game frame 112 and displays the animated dynamic array 122 (step 516) until the interactive game app 110 randomly selects a game frame 112 for display (step 518) from the dynamic array 122 comprising of a plurality of game frames 112, 112', which can be as numerous as the game creator elects.

In some embodiments, the multimedia content 124 is not stored with the interactive app 110 but rather requires that linking to the advertiser or game creator's website to retrieve the multimedia content 124. Accordingly, method 500 further comprises activating the embedded hyperlinks 118 or icons 120, 120' within the coded frame 116 and hyperlinking to the advertiser's website over the network 130 to retrieve the multimedia content 124 (step 520) so that it may be displayed. Interactive app 110 retrieves the multimedia content 124 (step 522) and the interactive game app 110 issues a command to the processor 104 which controls the displaying means 128 for displaying the selected at least one game frame 112 and its respective at least one multimedia content 124 (step 524) within the coded frame 116 and/or the like.

Hardware and Operating Environment

This section provides an overview of exemplary hardware and the operating environments in conjunction with which embodiments of the inventive subject matter can be implemented.

Figure 6A:
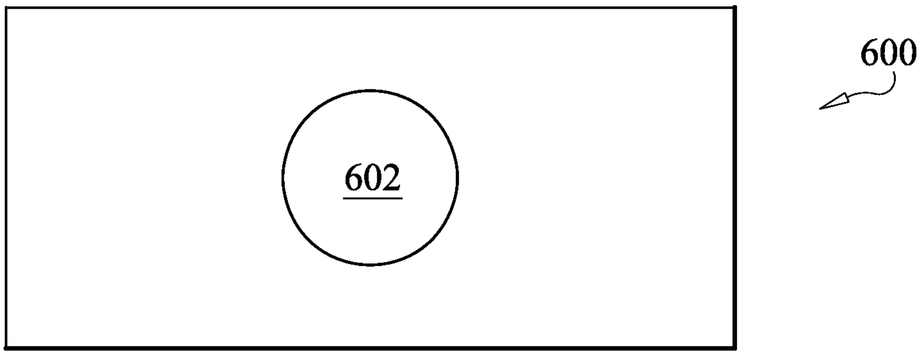
FIG. 6A shows a block diagram depicting a non-transitory computer readable medium in accordance with one embodiment.
Figure 6B:
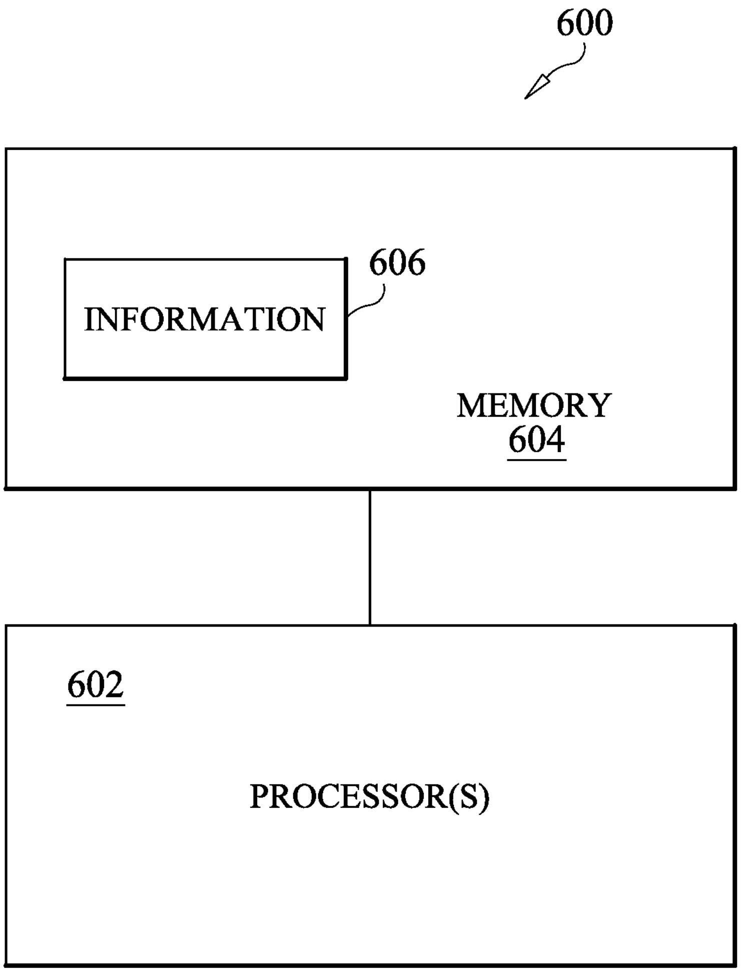
FIG. 6B shows a block diagram depicting an article in accordance with one embodiment.

A software program may be launched from a computer readable medium in computer-based systems 100-300 to execute the functions defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIGS. 6A & 6B below.

FIG. 6 is a block diagram representing an article according to various embodiments. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both) which, when accessed, results in a machine (e.g., the processor(s) 602) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

The invention claimed is:

1. A system comprising:

a) a mobile device that includes a computer processor in electronic communication with memory means;

b) image capturing means for scanning at least one coded advertising image within a coded frame that includes at least one or more hyperlinks or icons embedded within;

c) computer executable instructions executable by the computer processor and configured for launching an interactive game application that comprises of computer executable instructions and configured for performing any one or more of the following:

controlling at least one or more game frames corresponding to the at least one coded advertising image;

animating a dynamic array of game frames; and randomly selecting a game frame from the dynamic array for display; and activating the embedded at least one or more hyperlinks or icons for retrieving the multimedia content for display; and d) displaying means for displaying the dynamic array of game frames as well as the selected game frame and its respective at least one multimedia content.

2. The system of claim 1, wherein the dynamic array may include any one or more of the following: a virtual wheel barrel, a scrolling arrangement, a rotating circumferential arrangement, a dynamic matrix, or a pop-up arrangement.

3. The system of claim 1, wherein the at least one multimedia advertising content includes any one or more of the following: videos, promotions, prizes, giveaways, vouchers, coupons, coupon codes, bar codes, discounts, pricing, availability, store locations, directions, television commercials, radio advertisements, print advertisements, movies, and movie trailers.

4. The system of claim 1, wherein the interactive game application is further configured for receiving at least one command to animate the dynamic array of game frames.

5. The system of claim 4, wherein the interactive game application is further configured for displaying multimedia content prior to receiving a command to animate the dynamic array of game frames.

6. The system of claim 4, wherein the computer executable instruction code readable by the at least one processor are further configured for receiving a command to animate the dynamic array from an input device which may include any one of the following: a touchscreen, radio button, a pointing device, mouse, roller ball, arrow keys, a stylus, or a gesture recognition device.

7. The system of claim 1, wherein the interactive game application is further configured for retrieving the at least one multimedia advertising content for display by linking to an advertiser's website via its web address.

8. The system of claim 1, wherein animating the dynamic array further comprises of animating a virtual wheel barrel to virtually rotate and display the spinning virtual wheel barrel until the interactive game app randomly selects a game frame from the dynamic array of game frames.

9. A method comprising of:

scanning at least one coded advertising image within a coded frame that includes at least one or more hyperlinks or icons embedded within;

launching an interactive game application that comprises of computer executable instructions and configured for controlling at least one or more game frames corresponding to the at least one coded advertising image within the coded frame;

displaying a dynamic array of game frames;

animating the dynamic array of game frames;

randomly selecting a game frame from the dynamic array for display;

activating the embedded at least one or more hyperlinks or icons for retrieving the multimedia content for display; and displaying the selected game frame and its respective at least one multimedia content.

10. The method of claim 9, wherein the dynamic array may include any one or more of the following: a virtual wheel barrel, a scrolling arrangement, a rotating circumferential arrangement, a dynamic matrix, or a pop-up arrangement.

11. The method of claim 9, wherein the at least one multimedia advertising content includes any one or more of the following: videos, promotions, prizes, giveaways, vouchers, coupons, coupon codes, bar codes, discounts, pricing, availability, store locations, directions, television commercials, radio advertisements, print advertisements, movies, and movie trailers.

12. The method of claim 9, further comprising displaying multimedia content prior to receiving a command to animate the dynamic array of game frames.

13. The method of claim 9, further comprising receiving at least one command to animate the dynamic array of game frames.

14. The method of claim 12, wherein the step of receiving at least one command further comprises receiving the command from an input device, which may include any one of the following: a touchscreen, radio button, a pointing device, mouse, roller ball, arrow keys, a stylus, or a gesture recognition device.

15. The method of claim 11, wherein animating the dynamic array further comprises animating a virtual wheel barrel to virtually rotate and displaying the spinning virtual wheel barrel until the interactive game application randomly sleets a game frame for display.

16. The method of claim 11, wherein the interactive game application is further configured for retrieving the at least one multimedia advertising content for display by linking to an advertiser's website via its web address.

17. The method of claim 9, further comprising receiving at least one command for capturing the at least one coded frame image.

18. A system comprising:

a) a computer processor module in electronic communication with memory module;

b) image capturing module for scanning at least one coded advertising image within a coded frame that includes at least one or more hyperlinks or icons embedded within;

c) computer executable instructions executable by the computer processor module that is configured for launching an interactive game application module configured for performing any one or more of the following:

controlling at least one or more game frames corresponding to at least one coded advertising image within the coded frame;

animating a dynamic array of game frames; and randomly selecting a game frame from the dynamic array for display; and activating the embedded at least one or more hyperlinks or icons for retrieving the multimedia content for display; and d) displaying module for displaying the dynamic array of game frames as well as the selected game frame and its respective at least one multimedia content.

19. The system of claim 18, wherein the dynamic array may include any one or more of the following: a virtual wheel barrel, a scrolling arrangement, a rotating circumferential arrangement, a dynamic matrix, or a pop-up arrangement.

20. The system of claim 18, wherein the at least one multimedia advertising content includes any one or more of the following: videos, promotions, prizes, giveaways, vouchers, coupons, coupon codes, bar codes, discounts, pricing, availability, store locations, directions, television commercials, radio advertisements, print advertisements, movies, and movie trailers.

21. The system of claim 18, wherein the interactive game application module is further configured for receiving at least one command to animate the dynamic array of game frames.

22. The system of claim 21, wherein the interactive game application module is further configured for displaying multimedia content prior to receiving a command to animate the dynamic array of game frames.

23. The system of claim 21, wherein the computer executable instruction code readable by the at least one processor module are further configured for receiving a command to animate the dynamic array from an input device which may include any one of the following: a touchscreen, radio button, a pointing device, mouse, roller ball, arrow keys, a stylus, or a gesture recognition device.

24. The system of claim 18, wherein the interactive game application module is further configured for retrieving the at least one multimedia advertising content for display by linking to an advertiser's website via its web address.

25. The system of claim 18, wherein animating the dynamic array further comprises of animating a virtual wheel barrel to virtually rotate and display the spinning virtual wheel barrel until the interactive game app module randomly selects a game frame from the dynamic array of game frames.

* * * * *